United States Patent
Ross et al.

(10) Patent No.: US 6,370,509 B1
(45) Date of Patent: Apr. 9, 2002

(54) THREE-DIMENSIONAL PRODUCTION SCHEDULE DISPLAY FOR COMPUTER-IMPLEMENTED PRODUCTION MANAGEMENT SYSTEM

(75) Inventors: G. Terry Ross; Gregg Sporar, both of Austin, TX (US)

(73) Assignee: i2 Technologies US, Inc., Dallas, TX (US)

(*) Notice: Subject to any disclaimer, the term of this patent is extended or adjusted under 35 U.S.C. 154(b) by 0 days.

(21) Appl. No.: 09/282,912

(22) Filed: Mar. 31, 1999

(51) Int. Cl.⁷ .............................................. G06F 17/60
(52) U.S. Cl. .............................. 705/1; 345/419; 700/97
(58) Field of Search .................. 345/133, 139, 345/140, 418, 419, 420; 700/90, 97, 98; 705/1, 7, 8, 9

(56) References Cited

U.S. PATENT DOCUMENTS

| | | | |
|---|---|---|---|
| 3,474,240 A | * 10/1969 | Marquis et al. | 703/3 |
| 3,703,630 A | * 11/1972 | Gelder | 705/7 |
| 3,725,650 A | * 4/1973 | Gelder | 702/81 |
| 4,887,207 A | * 12/1989 | Natarajan | 705/10 |
| 5,991,528 A | * 11/1999 | Taylor et al. | 703/6 |
| 6,165,406 A | * 12/2000 | Jang et al. | 364/308 |

FOREIGN PATENT DOCUMENTS

| | | |
|---|---|---|
| JP | 09-305665 A | * 11/1997 |
| WO | WO-00/58899 A2 | * 10/2000 |

OTHER PUBLICATIONS

Diaby et al: "Capacitated Lot–Sizing and Scheduling by Lagrangean Relaxation"; European Journal of Operational Research; Jun. 25, 1992, vol. 59, No. 3, pp. 444–458, (Abstract Only).*

Huh: "Collaborative model management in departmental computing"; INFOR, Nov. 2000, vol. 38, No. 4, pp. 373–389.*

* cited by examiner

Primary Examiner—Edward R. Cosimano
(74) Attorney, Agent, or Firm—Baker Botts L.L.P.

(57) ABSTRACT

A method of displaying a production schedule in three dimensions. Time periods are displayed along an x-axis. Within each time period, an available-capacity rectangle has a width that is all or part of the width of the time period, such that the width represents the proportion of that time period during which capacity is available. Capacity-consuming rectangles are layered on top of the available-capacity rectangles, and include setup rectangles and production rectangles. The width of these rectangles represents the proportion of capacity consumed. The height of production rectangles represents production volume. Cost rectangles may be placed in front of the capacity consuming rectangles, and have a depth that represents relative monetary cost.

19 Claims, 4 Drawing Sheets

… (US 6,370,509 B1)

THREE-DIMENSIONAL PRODUCTION SCHEDULE DISPLAY FOR COMPUTER-IMPLEMENTED PRODUCTION MANAGEMENT SYSTEM

TECHNICAL FIELD OF THE INVENTION

This invention relates to computer-implemented tools for supply chain management, and more particularly to three dimensional displays of production schedules.

BACKGROUND OF THE INVENTION

Computer-implemented enterprise management systems are increasingly being used in factories and other enterprises. Such systems model the enterprise environment and provide plans for producing items to fulfill consumer demand within the constraints of the environment.

Many enterprise management problems can be represented as a constrained optimization problem. For example, consider the problem of sequencing a set of tasks on a single resource in a manufacturing environment. Assume each task has a deadline and that the objective is to schedule each task so that it is completed by its deadline. One way to view this problem is as a search in a space of start times. Under this view, the problem is a constrained optimization problem in which the variables are the start times, the constraint is that no tasks can overlap, and the objective is not missing deadlines. The "optimization" is in terms of one or more objective criteria, such as producing the most inventory, minimizing inventory, and the like.

One type of computer-implemented enterprise management tool is the type often referred to as "supply chain management". In the simplest sense, the supply chain is the process of creating products for customers. Supply chains span from raw materials to manufacturing, distribution, transportation, warehousing, and product sales. When the number of products, resources, and operations is large, managing the supply chain can be complex.

An entire supply chain can be single-enterprise, that is, it can exist entirely within a single company. Or it can be multi-enterprise, and span a number of enterprises before a product reaches a customer. Other terms for supply chain management, such as demand chain or value chain management, are sometimes used, but generally, these terms mean managing resources and tasks to transform raw materials into finished goods for consumers in an efficient manner.

Because of the complexity of supply chain management, it is important to present information to the user in a comprehensible manner. Good presentations, both display and printed reports, are vital to the usefulness of the supply chain management tool.

SUMMARY OF THE INVENTION

One aspect of the invention is a method of providing a three-dimensional display of a production schedule. Different displays are provided with different levels of detail. One level of display includes a display of one or more available-capacity rectangles along a first axis, each having a width along said first axis and a depth along a second axis, each available-capacity rectangle associated with a time period of said production schedule, said width representing available capacity as a proportion of said time period. At least one of the available-capacity rectangles has at least one capacity-consuming rectangle layered above it, each capacity-consuming rectangle having three dimensions along said first and second axes and along a third axis, such that the width of each said capacity-consuming rectangle represents capacity consumed in terms of time, and such that said height of each said capacity-consuming rectangle represents production volume. The capacity-consuming rectangles can be setup rectangles or production rectangles, ordered along the x-axis in the sequence in which they occur.

The three-dimensional representation permits more information on more production activities to be displayed simultaneously on the screen than is possible with a two dimensional display. It also permits the simultaneous display of three measures significant to production: time consumed, quantity produced, and cost of production.

DETAILED DESCRIPTION OF THE INVENTION

Overview of Computer-Implemented Supply Chain Management

System

Figure 1:
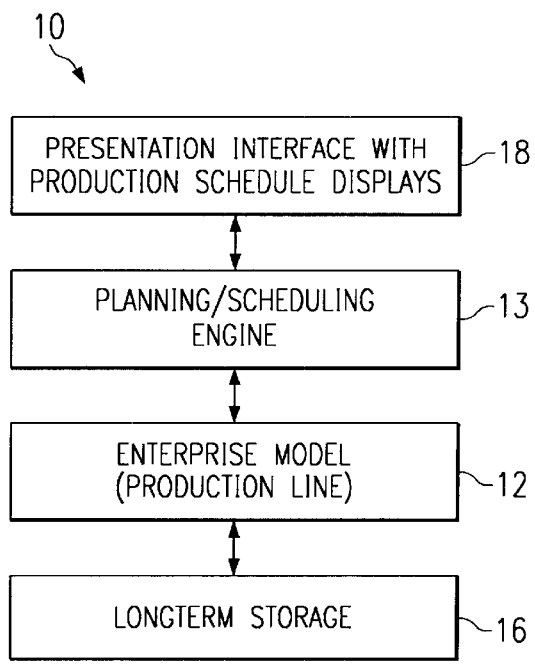
FIG. 1 is a block diagram of the software architecture of a computer-implemented supply chain management system that provides production schedule displays in accordance with the invention.

FIG. 1 is a block diagram of the software architecture of a computer-implemented supply chain management system 10 that provides production schedule displays in accordance with the invention. System 10 can be implemented on a computer having typical computer components, such as a processor, memory, storage devices, and input and output devices.

In operation, system 10 is used to provide production scheduling for a single plant or a multi-plant environment. System 10 may be part of a larger supply chain planning system that provides other supply chain solutions, such as demand planning, distribution planning, order promising, or transportation planning, or any combination of these.

One component of system 10 is a model 12 of the supply chain. Specifically, model 12 models the business enterprise in terms of its products and their components. The components require various tasks to produce, and these tasks use resources. For purposes of the present invention, which is directed to production schedules and their displays, it is assumed that model 12 includes at least a model of the production system. This might be one or more production lines or whatever resources are used to manufacture one or more productions.

Planning/scheduling engine 13 uses model 12 to generate planning and scheduling information. Generally, "planning" deals with aggregate quantities and long time horizons, whereas "scheduling" sequences a specific set of products to meet specific constraints. Both are sometimes referred to collectively as "planning", and are both provided by engine 13. An example of a suitable engine 13 is one based on linear programming techniques, where the goal is to find values that satisfy given constraints, such as time and resource availability, and to maximize or minimize the value of some objective function, such as maximization of profit. For purposes of the present invention, engine 13 performs at least the task of generating production schedules to be displayed in accordance with the invention.

Examples of commercially available products that can be adapted to implement the present invention are the RHYTHM modeling and scheduling tools, available from i2 Technologies, Inc. These tools, especially the RHYTHM SUPPLY CHAIN PLANNER, could be adapted to provide the features of the present invention, such as by extending its enterprise model to include cost modeling, extending its engine to provide for profit maximization planning, and extending its user interface to provide reports and other visualization of the planning results. A feature of the RHYTHM planning engine is that it considers all constraints simultaneously to generate a feasible plan. However, an engine using conventional manufacturing resource planning (MRP) logic could also be used.

For long term storage, model 12 and engine 13 are stored in long term storage memory 16. However, during operation of the invention, these components of system 10 are maintained in active computer memory for speed and efficiency.

A presentation interface 18 provides an interactive visualization for the user. Various displays and reports are appropriate for different aspects of management and planning and for different personnel. Three-dimensional displays specific to production scheduling are described below in connection with FIGS. 2–8.

System 10 may be implemented using object-oriented techniques. As explained below, object orientation concepts provide a highly interactive user interface as well as an internal representation that fairly represents a complex enterprise.

Typically, system 10 is implemented on a network of computers, such as a client-server system. In fact, the typical application of system 10 will be as a distributed system, where various personnel at different workstations may be provided with information relevant to the decisions encompassed by their job function. This type of network permits system 10 to provide different views at geographically distant stations used by personnel such as portfolio managers, master planners, line managers, and project managers.

Presentation Interface for Production Schedules

FIGS. 2–8 illustrate various examples of three-dimensional displays of production schedules in accordance with the invention. These displays represent different production schedule "views", having different levels of detail, selected by the user by means of a menu or some similar type of input.

Figure 2:
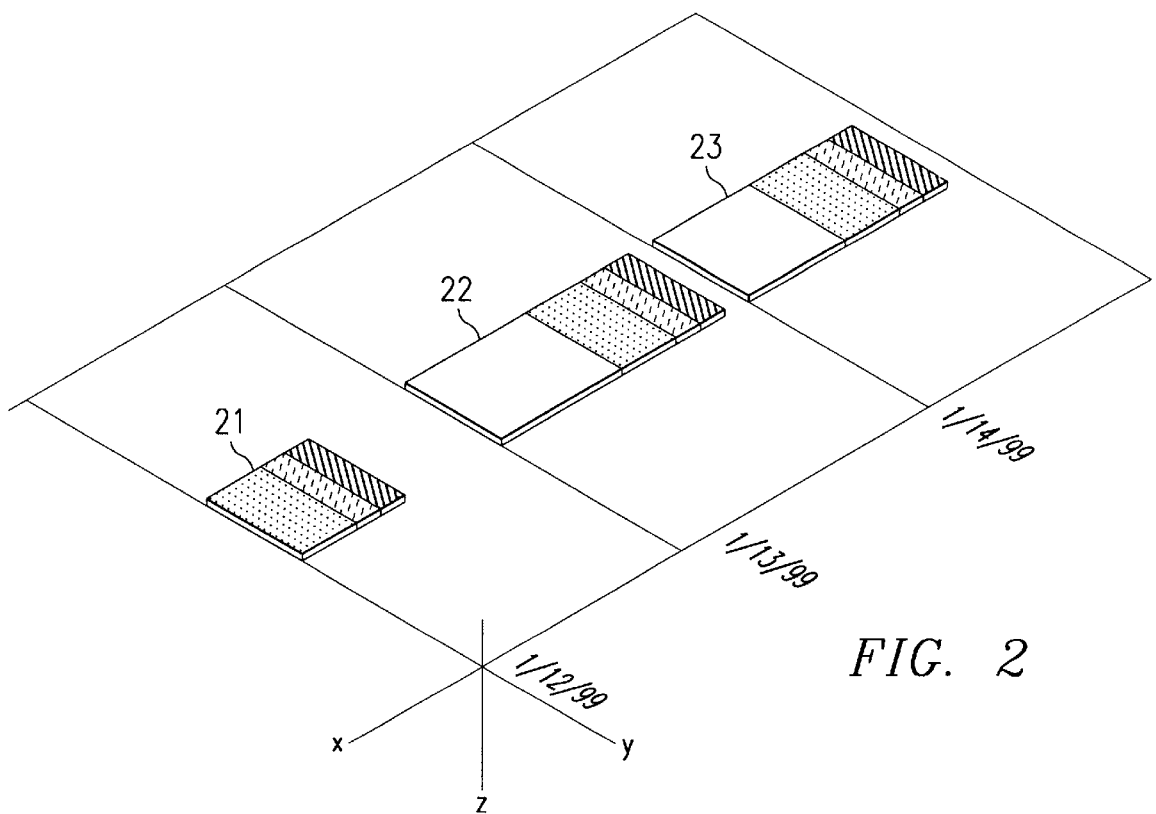
FIG. 2 is a very simple production schedule display, showing available capacity for several days.

FIG. 2 is a very simple production schedule display, showing available capacity for several days. As indicated, the display is oriented about a three-dimensional, x-y-z, coordinate system. The x-axis represents time, with the production schedule being represented in daily time periods. Other time periods, such as weeks, could be used. In FIG. 2, three days are shown.

Each time period contains an "available-capacity" rectangle. Thus, in the example of FIG. 2, each day contains an associated available-capacity rectangle, which are identified as rectangles 21, 22, and 23.

As will be explained below in connection with FIGS. 3–8, various additional types of rectangles may be placed in the time period for each day, on top of the available-capacity rectangles. As explained below, the width of these rectangles (along the x-axis) is relative to time. Their depth (along the y axis) is insignificant other than to show layering, except in the case of the cost rectangles discussed in connection with FIGS. 6 and 7. The height of the rectangles (along the z axis) is insignificant except in the case of production rectangles and item rectangles, discussed in connection with FIGS. 3–5. As will be explained below, each of the three axes represents a different parameter: time, volume, or cost. It should be understood, that identification of the three axes as x, y, and z is for reference only; the displays could be equivalently modified so that different axes represent the three parameters.

Referring specifically to FIG. 2, each available-capacity rectangle 21–23 is segmented to indicate amounts of different types of capacity. For example, a distinction can be made between straight time capacity and overtime capacity. In the example of FIG. 2, there are four types of capacity: straight time, overtime-1, overtime 2, and overtime-3. The different segments can be indicated with different colors. The ordering of the segments is typically in accordance with some sort of priority scheme, such as in accordance with the cost of each type of capacity. In the example of FIG. 2, straight time, which costs less than overtime, is ordered before overtime.

The width (along the x-axis) of each available-capacity rectangle 21–23 is proportional to the amount of capacity available in the corresponding time period. Thus, for example, if "full" capacity for one day is 16 work hours, a day having 100% capacity available would have an available-capacity rectangle extending the full width for that day. The units of capacity can vary; full capacity might be in terms of a 16 hour workday, in terms of 3 shifts, or any other units of measure. The particular measure for units of capacity may be customized for the enterprise being modeled.

In the example of FIG. 2, and assuming that full capacity is 16 hours, $\frac{1}{12}$ has half capacity (8 hours) available, whereas $\frac{1}{13}$ and $\frac{1}{14}$ each have full capacity (16 hours) available. Thus, regardless of the unit of measure for capacity, capacity amounts are normalized and scaled to the time represented for each day.

Figure 3:
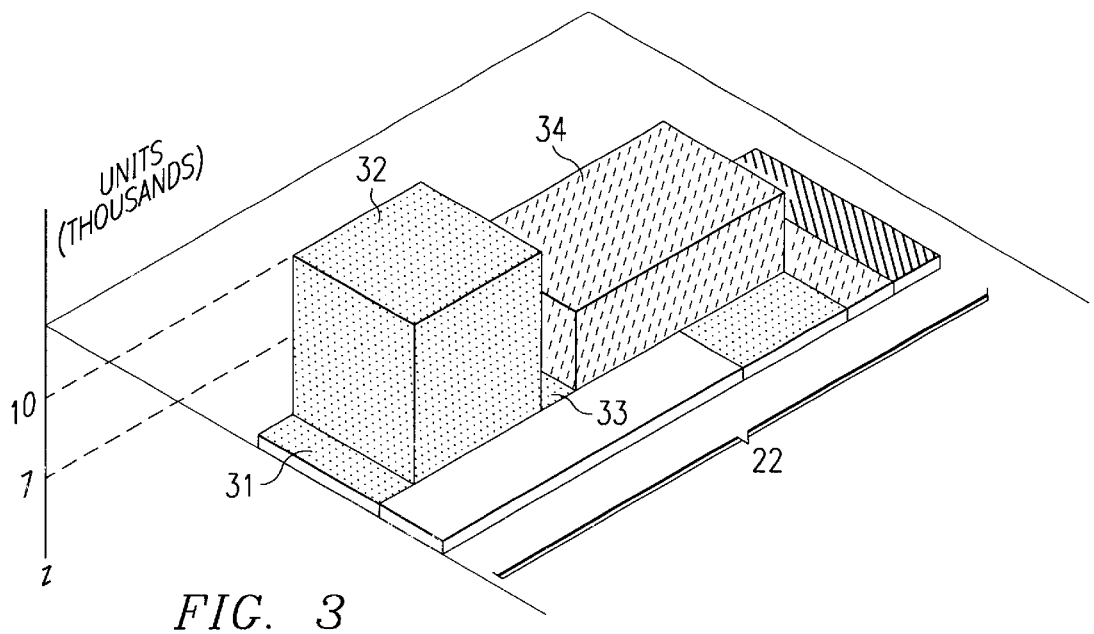
FIG. 3 illustrates one of the available-capacity rectangles from FIG. 2, with the addition of setup rectangles and production rectangles.
Figure 4:
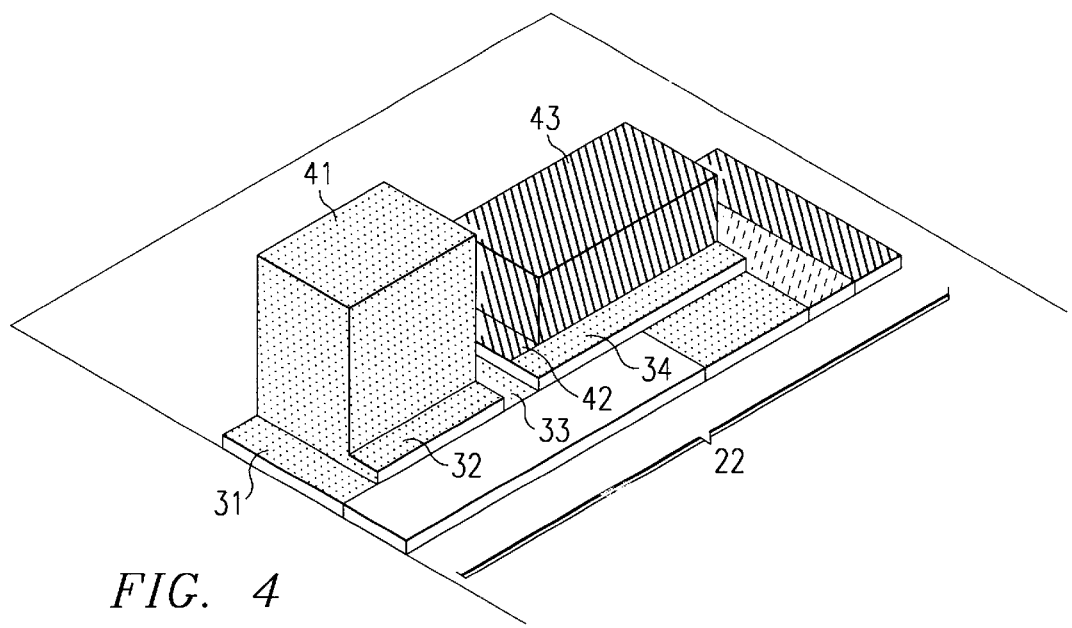
FIG. 4 illustrates the setup and production rectangles of FIG. 3, hut with additional detail for the production rectangles.
Figure 5:
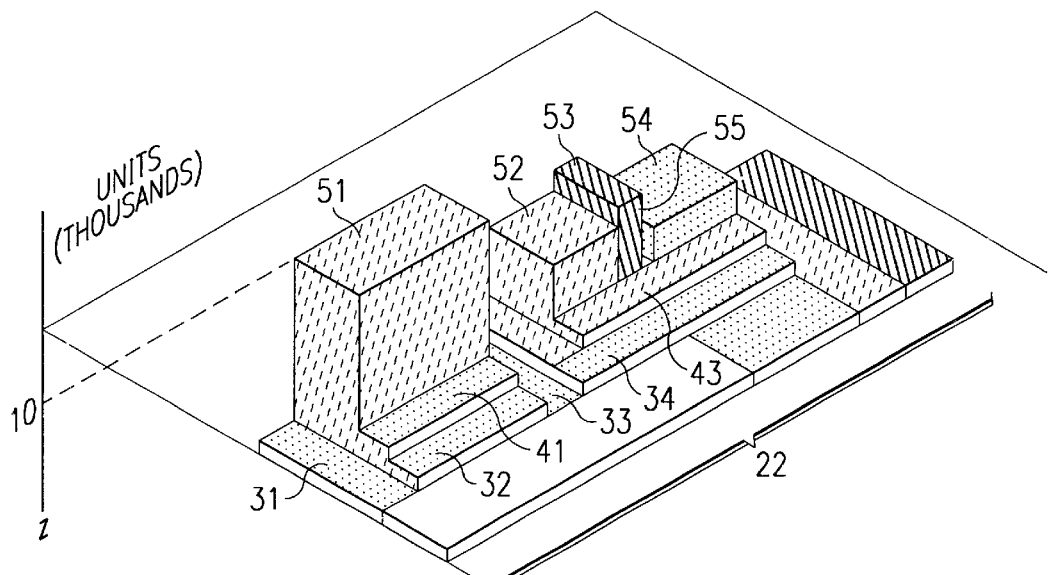
FIG. 5 illustrates a top layer of rectangles, each of which represents a type of item produced.

FIGS. 3–5 illustrate how capacity-consuming rectangles may be layered on top of available-capacity rectangles. These capacity-consuming rectangles represent activities that consume capacity on a production line.

Specifically, FIG. 3 illustrates the available-capacity rectangle 22 for $\frac{1}{13}$ from FIG. 2, with the addition of setup rectangles 31 and 33 and production rectangles 32 and 34.

Setup rectangles 31 and 33 represent setup activities that must occur before a production line can produce one or more items. Production rectangles 32 and 34 represent production of items for which the preceding setup was performed. In an actual display, a setup and the production associated with that setup could be displayed in the same color. Thus, for example, setup rectangle 31 and production rectangle 32 would be the same color.

In the example of FIG. 3, it is assumed that ice cream is to be produced in quart containers and then in pint containers. Setup and production for quarts are represented by setup rectangle 31 and production rectangle 32. Setup and production for pints are represented by setup rectangle 33 and production rectangle 34.

The sequence in which rectangles 31–34 appear depicts the sequence in which the associated activities are performed. Thus, in the example of FIG. 3, production for quarts is preceded by a setup for quart containers. Thus, a setup rectangle 31 for quart containers is followed by a production rectangle 32 representing a production run for quarts. The next setup rectangle 33 represents time lost in setting up for pints.

The width of each setup rectangle 31 and 33 and each production rectangle 32 and 34 represents how much capacity (in terms of duration of time) is consumed by that activity. The total width of a day's setup and production rectangles indicates how much capacity they consume for that day. In the example of FIG. 3, the setup and production for the day consume all of the first two types of capacity, that is, all of straight time and overtime-1. The only remaining available capacity on that day is overtime-2 and overtime-3 capacity. In this manner, the user can easily see the extent to which capacity is consumed on a particular day and the cost of using remaining capacity.

The height of setup rectangles 31 and 33 is not numerically significant. The height of production rectangles 32 and 34 indicates a bounding box height for production activities, as measured in terms of units produced. In the example of FIG. 3, the production rectangle 32 for quarts indicates a production boundary of 10,000 quarts, whereas the production rectangle 34 for pints indicates a production boundary of 7,000 pints. A display of actual items produced within these bounds is discussed below in connection with FIG. 5.

The depth of the capacity-consuming rectangles 31–34 is not numerically significant. However, the setback of these rectangles relative to the available-capacity rectangle 22 permits the user to discern the type of capacity that a particular activity is consuming.

FIG. 4 illustrates the setup and production rectangles 31–34 of FIG. 3, but with additional detail for production rectangles 32 and 34. Specifically, in FIG. 4, each production rectangle 32 and 34 has been "flattened" to display "minor" setups for that production run. For purposes of this description, a rectangle is "flattened" by reducing its height to a numerically insignificant value so that additional layers of detail can be displayed on top of it. The setups and production runs displayed in FIG. 3 are "major" setups and production runs, whereas the setups and production runs displayed in FIG. 4 are either "major" or "minor" setups or production runs, as indicated by two different layers.

In the example of FIG. 4, after a major setup for quarts, indicated by setup rectangle 31, the production run consists of production of sherbet items. This production is indicated by production rectangle 41, which is atop production rectangle 32. Thus, comparing FIGS. 3 and 4, production rectangle 32 of FIG. 3 has been flattened, thereby revealing that it contains the minor production rectangle 41.

The minor production represented by rectangle 41 did not consume setup time, as indicated by the equal width of minor production rectangle 41 and its associated major production rectangle 32. In contrast, the major setup for pints, indicated by setup rectangle 33, is followed by a minor setup for chocolate. This setup consumes time as indicated by the width of the minor setup rectangle 42 preceding its associated minor production rectangle 43. Rectangle 34 has been flattened as compared to FIG. 3.

The depth of minor setup and production rectangles 41–43 is not numerically significant. However, the setback of these rectangles relative to the major production rectangles 32 and 34 permits the user to identify the underlying major production rectangle 32 or 34. Color may be used to distinguish between different setups and production runs.

FIG. 5 illustrates a top layer of rectangles, item rectangles 51–54, each of which represents a type of item produced. Within a given production run, the items illustrated by item rectangles are the same in terms of the setups required to produce them, but might be different stock-keeping units (SKUs). For example, within production rectangle 34, which is for production of chocolate ice cream in pints, three different SKU types of chocolate pints might be produced. These three SKU types are indicated by item rectangles 52–54.

The height of an item rectangle 51–54 corresponds to the quantity produced of the item. The width of an item rectangle 51–54 corresponds to the capacity consumed to produce that quantity of the item. Color may be used to distinguish one item from other items. The sequence of item rectangles corresponds to the sequence in which the items are produced. Thus, the display of FIG. 5 permits simultaneous display of the quantity of an item produced on one dimension (height) and the capacity consumed to produce the item on a second dimension (width).

Referring again to FIG. 3, as stated above, production rectangles 32 and 34 are bounding boxes for both minor setup times and volume of items produced. In FIG. 5, as compared to FIG. 3, production rectangles 32 and 34 have been "flattened". Their associated minor setup rectangles and item rectangles define the bounding box production rectangles 32 and 34 illustrated in FIG. 3. For a given production run, the total duration of minor setups and production defines width (time) and the maximum volume of items produced define height (volume).

For the user's point of view, the display of FIG. 3 can be used as a "summary" of the display of FIG. 5. The major setup rectangles and the large production rectangles of FIG. 3 can be viewed as a summary of the individual activities that are planned for a particular major setup.

In FIG. 5, as indicated by the item-specific setup rectangle 55, an item-specific setup time might be required to change from a house brand container, item rectangle 53, to a promotional container, item rectangle 54.

As illustrated by FIGS. 3–5, the three-dimensional display makes it possible to display a hierarchy among setups by layering one or more setups on top of another. The sequence of setup rectangles corresponds to the sequence in which setups of that particular type are performed. Displaying setup activities in sequence accurately depicts the production schedule through time. By assigning colors to setups and items in accordance with their position in a preferred sequence, it is readily apparent whether or not the schedule follows a preferred sequence. For example, a preferred sequence may do setups in a "light-to-dark" order (e.g. vanilla flavor before chocolate flavor). By associating a light color with a setup that should come first (vanilla) and a dark color with a setup that should come last (chocolate), it is easy to see from the sequence of colors whether or not the schedule conforms to the desired sequence.

Figure 6:
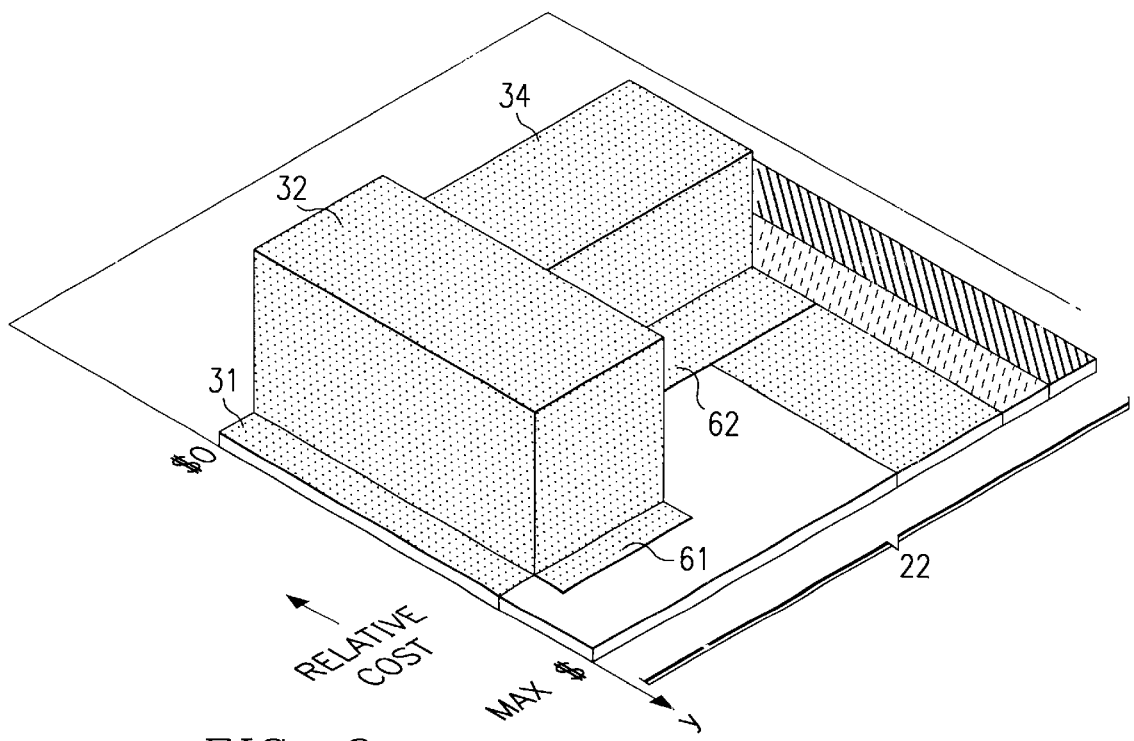
FIG.6 illustrates an additional type of rectangle, those representing monetary cost.

FIG. 6 illustrates an additional type of rectangle, those representing monetary cost. FIG. 6 is the same view as FIG. 3, but with the addition of cost rectangles 61 and 62. For cost rectangles 61 and 62, depth is indicative of monetary amount. In FIG. 6, the costs are those associated with major setups, that is, the setups indicated by setup rectangles 31 and 33 (with only setup rectangle 31 being visible in the view of FIG. 6).

Whereas times and quantities (along the x-axis and the z-axis respectively) are absolute, costs along the y-axis are relative. In other words, the depth of a cost rectangle is relative to the depths of other cost rectangles. A cost rectangle having maximum depth represents an activity whose cost is the most expensive for that type of activity. In the example of FIG. 6, cost rectangle 61 is associated with major setup rectangle 31 and indicates that the cost for that major setup is about ½ of the most expensive cost for a major setup. Although numerical cost values are not illustrated in FIG. 6, in other embodiments, such numbers could also be displayed.

Costs can also be illustrated for additional levels of detail, specifically, for minor setups and for item-level activities. Thus, FIGS. 4 and 5 could also be displayed with cost rectangles.

Figure 7:
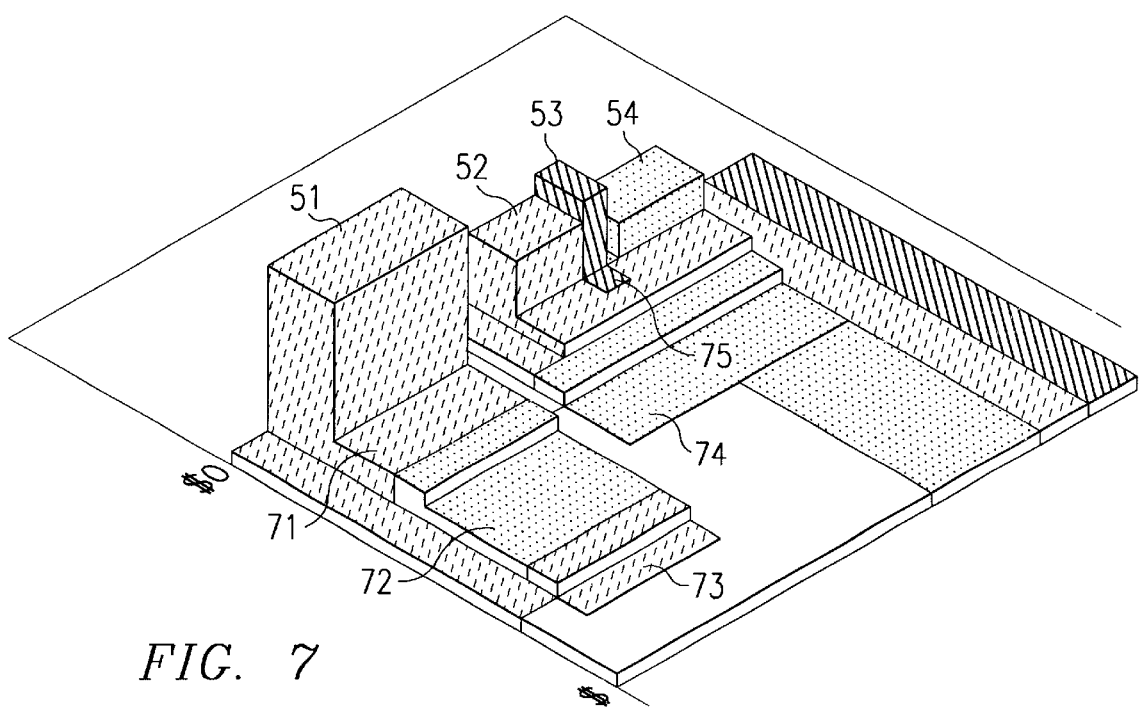
FIG. 7 illustrates a display of costs at the item level of detail.

FIG. 7 illustrates a display of costs at the item level of detail. Thus, FIG. 7 is the same view as FIG. 5 but with cost rectangles 71–75. As indicated, the relative cost of the major setup, the minor setup(s), and the item-level production for any item is indicated along the y-axis. The cost rectangle 75 in front of item rectangle 53 indicates a setup cost for that item.

The displays of FIGS. 6 and 7 illustrate how capacity on a line is consumed (in terms of time) and cost is incurred (in terms of money) in order to produce an item. To depict this, the base of a major setup rectangle, a minor setup rectangle, or an item rectangle, may be surrounded on two sides (left and front) by planes. Thus, both the time consumed and the cost incurred by a setup are depicted, in addition to the production schedule.

As the user becomes familiar with the displays of FIGS. 2–7, the user becomes adept at recognizing patterns and problems. For example, a production run that is particularly expensive will have cost rectangles that "stick out" because of their depth. Such a run can be immediately spotted by the user while reviewing the displays. In contrast, a production run with "shallow" costs will be of less concern. Varying heights can be used to immediately balance considerations such as demand and inventory capacity.

Figure 8:
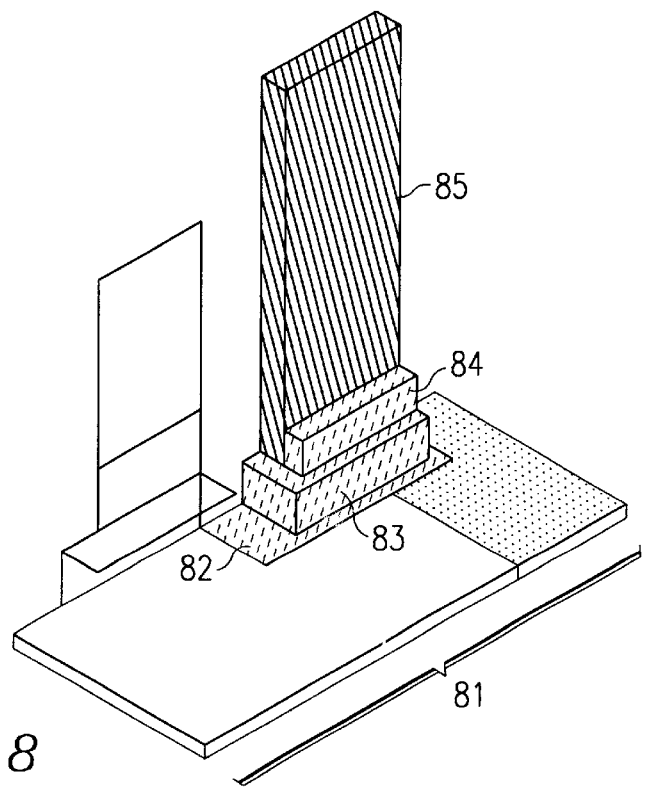
FIG. 8 illustrates how setup and production activities that consume capacity but that are not selected for display by the user can be represented by zero height or zero depth rectangles.

FIG. 8 illustrates how setup activities that consume capacity, but that are not selected for display by the user can be represented by zero height or zero depth rectangles. This permits activities to be filtered out for display, and yet make the user aware of their existence and the capacity they are consuming. Costs could be similarly illustrated.

In the example of FIG. 8, an available-capacity rectangle 81 has associated capacity-consuming rectangles 82–85, respectively. These capacity-consuming rectangles are currently selected as being of interest to the user. Other capacity-consuming rectangles on the same day but preceding those of interest are shown in "wire-frame" form.

During display of a production schedule, a user can modify the schedule by working directly with the graphical display. For example, a user can select a rectangle corresponding to the production of an item and drag it to increase or decrease its size. Alternatively, a user can select an element of the display by clicking on it with a mouse cursor to cause a pop-up window to appear. The user can enter changes to the schedule in the pop-up window, and the graphical display will be redrawn to correspond to the edited values.

OTHER EMBODIMENTS

Although the present invention has been described in detail, it should be understood that various changes, substitutions, and alterations can be made hereto without departing from the spirit and scope of the invention as defined by the appended claims.

We claim:

1. A method of providing a three-dimensional display of a production schedule, comprising the steps of:

displaying one or more available-capacity rectangles along a first axis, each having a width along said first axis and a depth along a second axis, each available-capacity rectangle associated with a time period of said production schedule, said width representing available capacity as a proportion of said time period; and displaying at least one capacity-consuming rectangle atop at least one of said available-capacity rectangles, each capacity-consuming rectangle having three dimensions along said first and second axes and along a third axis, such that the width of each said capacity-consuming rectangle represents capacity consumed in terms of time, and such that said height of each said capacity-consuming rectangle represents production volume.

2. The method of claim 1, wherein said capacity-consuming rectangles comprise setup rectangles, whose widths represent duration of setup times.

3. The method of claim 1, wherein said capacity-consuming rectangles comprise production rectangles whose widths represent duration of production runs.

4. The method of claim 1, wherein said capacity-consuming rectangles comprise setup rectangles, whose widths represent duration of setup times, and wherein said capacity-consuming rectangles further comprise production rectangles, whose widths represent duration of production runs, each said setup rectangle preceding an associated production rectangle.

5. The method of claim 1, further comprising the step of displaying cost rectangles in front of said capacity-consuming rectangles, the depth of each said cost rectangle representing the monetary cost of an associated capacity-consuming rectangle.

6. A computer-implemented production management system, comprising:

a model of a production system;

a scheduling engine operable to generate production schedules to be performed by said production system; and a presentation interface operable to provide three-dimensional displays representing said production schedules by performing the following steps: displaying one or more available-capacity rectangles along a first axis, each having a width along said first axis and a depth along a second axis, each available-capacity rectangle associated with a time period of said production schedule, said width representing available capacity as a proportion of said time period; and displaying at least one capacity-consuming rectangle atop at least one of said available-capacity rectangles, each capacity-consuming rectangle having three dimensions along said first and second axes and along a third axis, such that the width of each said capacity-consuming rectangle represents capacity consumed in terms of time, and such that said height of each said capacity-consuming rectangle represents production volume.

7. The system of claim 6, wherein said capacity-consuming rectangles comprise setup rectangles, whose widths represent duration of setup times.

8. The system of claim 6, wherein said capacity-consuming rectangles comprise production rectangles whose widths represent duration of production runs.

9. The system of claim 6, wherein said capacity-consuming rectangles comprise setup rectangles, whose widths represent duration of setup times, and wherein said capacity-consuming rectangles further comprise production rectangles, whose widths represent duration of production runs, each said setup rectangle preceding an associated production rectangle.

10. The system of claim 6, further comprising the step of displaying cost rectangles in front of said capacity-consuming rectangles, the depth of each said cost rectangle representing the monetary cost of an associated capacity-consuming rectangle.

11. A presentation interface for a computer-implemented production scheduling system, comprising programming media operable to perform at least the following steps when executed by at least one computer processor controlled by data stored in the programming media:

display one or more available-capacity rectangles along a first axis, each having a width along said first axis and a depth along a second axis, each available-capacity rectangle associated with a time period of said production schedule, said width representing available capacity as a proportion of said time period; and display at least one capacity-consuming rectangle atop at least one of said available-capacity rectangles, each capacity-consuming rectangle having three dimensions along said first and second axes and along a third axis, such that the width of each said capacity-consuming rectangle represents capacity consumed in terms of time, and such that said height of each said capacity-consuming rectangle represents production volume.

12. The programming media of claim 11, wherein said programming is further operable to modify said production schedule in response to manipulation of said rectangles on said display.

13. The programming media of claim 11, wherein said programming is further operable to display production schedule modification options on said display and to modify said production schedule in response to selection of one or more of said options.

14. The programming media of claim 11, wherein said programming media is further operable to display minor setup rectangles and production run rectangles inside said production rectangles.

15. The programming media of claim 11, wherein said programming media is further operable to display segments within said available-capacity rectangles, which represent different types of capacity.

16. A method of providing a three-dimensional display of a production schedule, comprising the steps of:

displaying one or more available capacity-rectangles along a first axis, each having a width along said first axis and a depth along a second axis, each available capacity rectangle associated with a time period of said production schedule, said width representing available capacity as a proportion of said time period;

displaying at least one setup rectangle atop at least one of said available-capacity rectangles, each setup rectangles having a width and a depth, said width representing a duration of that setup; and displaying at least one production rectangle atop at least one of said available-capacity rectangles, each production rectangle having three dimensions along said first and second axes and along a third axis, such that the width of each said production rectangle represents duration of a production run in terms of time, and such that said height of each said production rectangle represents production volume.

17. The method of claim 16, further comprising the step of displaying cost rectangles in front of said production rectangles, the depth of each said cost rectangle representing the monetary cost of an associated production rectangle.

18. The method of claim 16, further comprising the step of providing a more detailed view of said production rectangles, such that minor setup rectangles within said production rectangles are displayed.

19. The method of claim 16, further comprising the step of providing a more detailed view of said production rectangles, such that items produced within each production rectangle are displayed.

* * * * *